United States Patent

Wells et al.

[11] Patent Number: 5,999,601
[45] Date of Patent: Dec. 7, 1999

[54] METHOD AND APPARATUS FOR DISTRIBUTED NUMBER QUALIFICATION

[76] Inventors: Robbin Wright Wells, 15 Lisa Dr., Wrentham, Mass. 02093; Robert Hubener, 54 Brookside Rd, Topsfield, Mass. 01983

[21] Appl. No.: 08/748,818

[22] Filed: Nov. 14, 1996

[51] Int. Cl.[6] .................................................. H04M 11/00
[52] U.S. Cl. ............................ 379/100.14; 379/100.09; 379/100.12; 358/440
[58] Field of Search ..................... 379/100.14, 100.09, 379/100.12, 355, 100.08, 100.01; 358/407, 440

[56] References Cited

U.S. PATENT DOCUMENTS

| | | | |
|---|---|---|---|
| 4,555,594 | 11/1985 | Friedes et al. | 179/18 B |
| 4,565,903 | 1/1986 | Riley | 179/18 B |
| 4,751,726 | 6/1988 | Treat | 379/113 |
| 4,866,763 | 9/1989 | Cooper et al. | 379/221 |
| 5,018,191 | 5/1991 | Catron et al. | 379/100 |
| 5,033,079 | 7/1991 | Catron et al. | 379/100 |
| 5,333,184 | 7/1994 | Doherty et al. | 379/115 |
| 5,406,620 | 4/1995 | Pei | 379/220 |
| 5,420,914 | 5/1995 | Blumhardt | 379/114 |
| 5,473,681 | 12/1995 | Partridge, III | 379/229 |
| 5,475,749 | 12/1995 | Akinpelu et al. | 379/221 |
| 5,533,107 | 7/1996 | Irwin et al. | 379/201 |
| 5,550,015 | 8/1996 | Partridge, III | 379/355 |
| 5,550,910 | 8/1996 | DeJager | 379/220 |
| 5,550,912 | 8/1996 | Akinpelu et al. | 379/221 |
| 5,553,129 | 9/1996 | Partridge, III | 379/220 |
| 5,581,757 | 12/1996 | Maxey | 358/407 |
| 5,761,284 | 6/1998 | Ranalli et al. | 379/100.09 |
| 5,832,225 | 11/1998 | Hacherl et al. | 707/200 |

*Primary Examiner*—Stella Woo

[57] ABSTRACT

Method and apparatus for qualifying fax numbers for a select network, such as a store-and-forward network, which includes a distributed database stored in or accessible by each of a plurality of access nodes in the select network, and a local database in each autodialer connected to an associated fax machine and at least one access node. Methods are provided for updating the distributed and local databases to avoid each autodialer of a given customer group having to validate a number already validated by another member of the group.

13 Claims, 3 Drawing Sheets

METHOD AND APPARATUS FOR DISTRIBUTED NUMBER QUALIFICATION

FIELD OF THE INVENTION

The present invention concerns delivery of facsimile (fax) documents over a value added network, such as a store and forward network, and more particularly to a method and apparatus for qualifying fax numbers prior to delivery over such network.

BACKGROUND OF THE INVENTION

As a mechanism to carry information over long distances, store-and-forward (S&F) networks offer an efficient, low-cost alternative to the existing public switched telephone network (PSTN). In general, S&F networks operate parallel to, and are accessed by, the PSTN.

FIG. 1 shows schematically PSTN 30 and S&F network 80 connected in parallel between a source fax machine 10 and a destination fax machine 70. An autodialer 12, positioned between the source fax machine and PSTN 30, designates incoming faxes for transmission over either the PSTN 30 or S&F network 80. If for example the destination of the incoming fax is not one serviced by the S&F network, then the autodialer dials the destination fax number directly to the local exchange 32; the call is then carried in a normal fashion by the PSTN 30 to the destination local exchange 36 and the destination fax machine 70. In contrast, if the number is one serviced by the S&F network, the autodialer dials the telephone number corresponding to that of the source network node 20. The local exchange 32 then routes the call through the PSTN to the source node. (Note that, depending upon their proximity, the source fax machine 10 and the source network node 20 may be served by the same or different local exchanges.) Once it has completely received the document, the source node 20 transfers it to the destination network node 40 over dedicated circuit 60. At this point, the destination node 40 dials the destination fax number to its local exchange which in turn transfers the call via the PSTN to the destination fax machine 70. (Note again that, depending upon their proximity, the destination fax machine 70 and the destination network node 40 may be served by the same or different local exchanges.)

In summary, transport of information from the source fax machine to the destination fax machine using the S&F network requires three distinct steps:

(1) transport from the source fax machine to the source network node via the PSTN;

(2) transport from the source node to the destination node via dedicated circuits; and (3) transport from the destination node to the destination fax machine, again via the PSTN.

Store-and-forward networks offer a number of significant advantages over standard telephone networks for transport of facsimile. For example, a fax document can be carried 16 times more efficiently using technology employed by S&F networks. A common annoyance in telephony is the inability to complete a call, usually because the destination device is busy or does not answer. Although sophisticated voice mail systems have been designed to overcome this problem in voice telephony, similar practical and cost effective solutions do not exist for fax. S&F networks offer a viable solution. A properly implemented S&F network will employ a sufficiently large number of telephone circuits such that a customer fax machine never encounters a busy signal when attempting to send a fax via the network. At the destination end, it is a common practice to design into S&F networks the ability to automatically redial those call attempts which encounter "busy" or "no-answer" signals. Normally, the calls are redialed periodically over a fixed interval of time, every ten minutes for a half hour, for example.

Since multiple messages are typically coursing through an S&F network at any point in time, it is important to have some mechanism to monitor the location and status of each. For example, in one known S&F network, a small data file called an envelope is created to track each fax document as it moves through the network. The source node creates the envelope after it receives an incoming fax document. As the fax document moves through the network, the envelope moves between the network devices and receives continuous updates regarding the status of the fax. This enables substantially real-time monitoring of the fax delivery process.

In the known S&F network, upon concluding the delivery attempt process, the destination network node declares the fax document either "delivered" or "not delivered"; it records the status in the corresponding envelope which is then returned to the source node. If the delivery was successful, the envelope is forwarded to a historical database (HD) which provides a basis for constructing customer bills. If the delivery was not successful, the envelope is forwarded to a delivery assist system (DAS) for further processing. DAS is a database management system which provides a human operator, the document delivery analyst, with the delivery history and options for resubmission to the network of the document in question. One of the possible actions the analyst may take is to assign the fax document to an alternate destination number, i.e., one provided by either the sender or the receiver.

Wrong numbers, i.e., destination numbers that do not terminate on the fax machine, add enormously to the cost of delivery on a store-and-forward network. For example, it has been determined that up to 40% of delivery problems have been associated with mis-dialed fax numbers. Wrong numbers may be significantly reduced by requiring the customer to provide a list of commonly used fax numbers which is then entered into the autodialer memory or database. Upon receiving a dialed number from the attached fax machine, the autodialer compares it to its database; if a match is found, the call is transferred to the S&F network. However, this method places a considerable burden on the customer to provide a complete list of validated fax numbers, which may change over time. In addition, there is the problem of entering the numbers in each autodialer, which for a customer with a large number of fax machines, is expensive and time-consuming.

Another method of determining valid fax numbers is for the autodialer itself to qualify numbers. In this method, when the autodialer receives a fax number which is not part of its database, it routes the fax number to the PSTN, and monitors the call to determine if the destination is a fax machine; if so, it adds the number to its database. Thus, the next time this autodialer receives a call for that destination, the number is found in its database and the call consequently routed to the S&F network. There is no need to burden the customer with providing endless lists of valid numbers.

The above methodology has a deficiency, however. It is common for organizations to utilize more than one fax machine; indeed, in some cases the machines number in the hundreds. Often, fax documents are sent to the same destinations from many or all of the machines. Because each fax machine is served by its own autodialer, a destination telephone number could theoretically require requalification as many times as the number of fax machines in the organization. Clearly this is disadvantageous to both the customer and the network operator. The customer is deprived of the savings and higher quality service each time a call is unnecessarily requalified. The network operator is not only deprived of the additional revenue but, more importantly, appears inefficient as a service provider.

SUMMARY OF THE INVENTION

In accordance with the present invention, a distributed method of qualifying fax numbers is provided, which is less burdensome and more cost-efficient than prior methods. Instead of each autodialer separately qualifying each new number, a coordinated process is provided for accomplishing the same.

In accordance with the present method embodiment, each autodialer will monitor its associated fax machine for outgoing calls. It will intercept an outgoing fax number and compare the same to a first local database of qualified fax numbers stored at the autodialer. If a match exists with a number in the first database, a connection is made to an access node of the selected (e.g., S&F) network. If no match exists (with a number in the first database), then the autodialer contacts an access node where the outgoing fax number is compared to a second distributed database of valid fax numbers, stored at (or accessible to) the access node. If a match exists with a number in the second database, the access node sends a message to the autodialer indicating that it will accept the requested connection. The first database, within the autodialer, is then updated to include the (qualified) outgoing fax number.

If no match exists with a number in the second database, the autodialer terminates the call with the network node and dials the destination number via the PSTN. This new connection is monitored; if a fax machine answers, the now qualified number is added to the first (autodialer) database. The next time the autodialer contacts the network node, this newly qualified number is transferred to it, allowing the second distributed database to be updated. This newly qualified number is now available to every autodialer of the customer as explained above.

The present invention avoids the problem of each autodialer of a given customer group having to validate a number already validated by one member of the group. It avoids lost revenue to the network provider by not having separate autodialers validate the same number on the PSTN. It avoids customer confusion and dissatisfaction with having multiple calls to valid numbers routed via the PSTN, thereby denying access to the improved delivery service of the S&F network.

These and other features and benefits of the present invention will be more particularly described in regard to the following detailed description and figures.

DETAILED DESCRIPTION

A standard S&F network access node normally contains the following four key components:

1. Fax Transmit/Receive Agent (FTR)—As the name implies, this component is responsible for transmitting documents to and receiving documents from fax machines. Software processes which reside on this component control the actual transmission and reception of the fax document and control the movement of the fax document and other auxiliary messages to the remaining key components within the access node.

2. Traffic Administrator (TA)—This component is responsible for monitoring and controlling the movement of the fax document through the S&F network once it leaves the FTR.

3. File Server (FS)—This component is responsible for storing fax documents. It receives documents from the local FTR and, upon request, transmits them to the destination FTR. Upon receiving information that a document has either been successfully delivered or cancelled, the local TA notifies the FS to delete the document from its memory. This procedure prevents the network from ever losing a customer document.

4. Router—This component manages the flow of information between and among the other machines which make up the network node. Further, it formats data and manages its transport to other nodes on the network.

Figure 2:
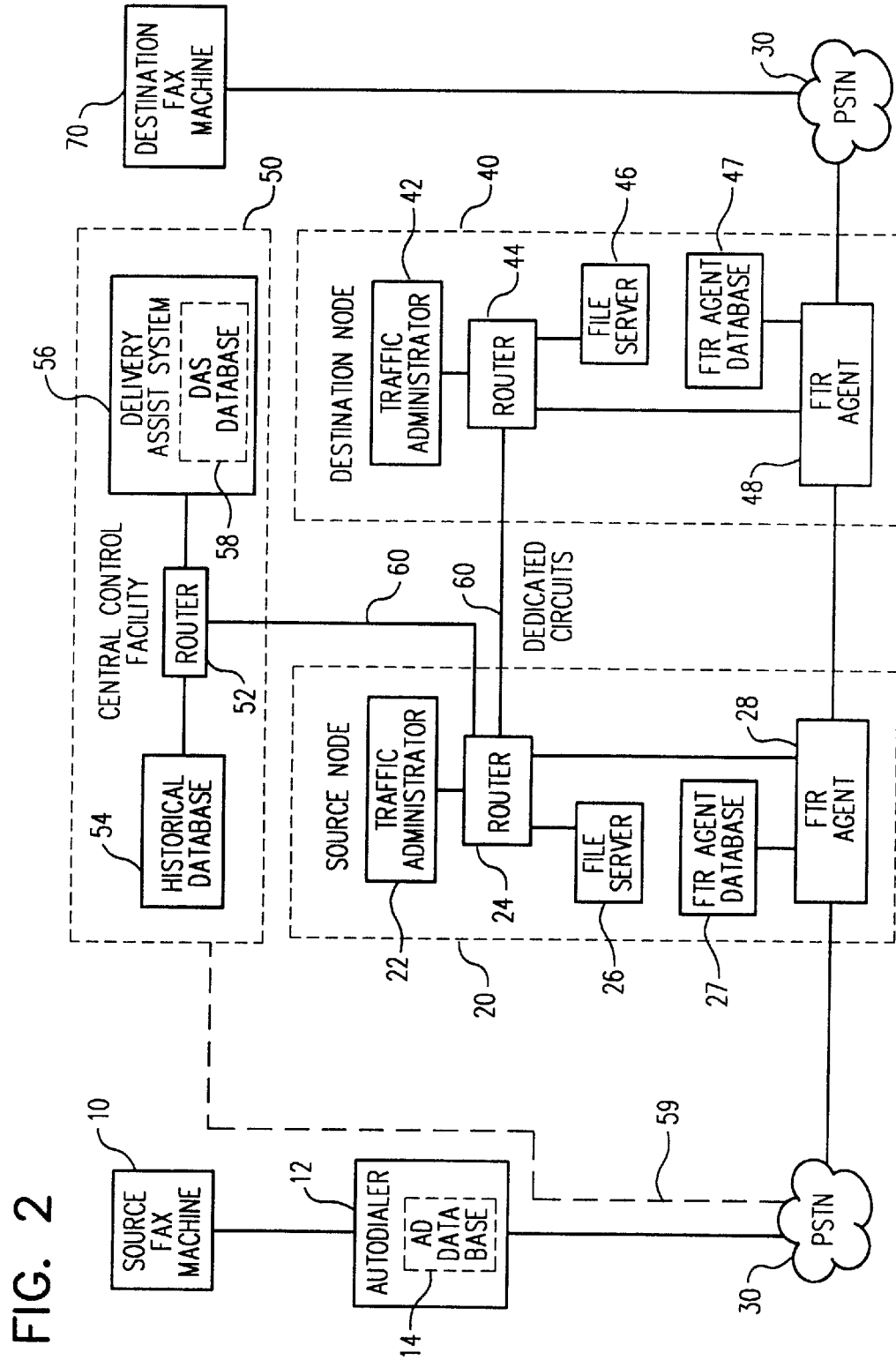
FIG. 2 is a more detailed illustration of an S&F network.

FIG. 2 illustrates in greater detail the components of an S&F network, which have been modified in accordance with an embodiment of the present invention.

In normal operation, the network provider signs up a customer anywhere in the world and attaches an autodialer device 12 to each of the customers' fax machines. In this embodiment, the autodialer (AD) is programmed to route to the S&F network only numbers known to access fax machines; these numbers are stored in the autodialer's internal (local) AD database 14 and are known as "qualified" or "valid" numbers. A list of qualified fax numbers may be initially provided by the customer. Alternatively or in addition, the autodialer may use its number qualification (NQ) capability to initiate and/or increase its store of valid numbers. For example, a "learning" autodialer will route unknown numbers to the PSTN and monitor the call to determine if it terminates at a fax machine; if yes, the number is added to the local database 14 for future reference.

The customer loads a document into a fax machine 10 and dials the destination fax number. The autodialer 12 attached to the customer's fax machine screens the dialed number, i.e., determines whether it is contained in the local database 14 of valid numbers. If it detects a valid destination fax number, it dials the network provider number, i.e., the telephone number of a source access node 20. The public switched telephone network (PSTN) 30 then transfers the call to the fax transmit/receive agent FTR 28 at the source node 20.

The source FTR 28 answers the call and emits a sequence of dual-tone multi-frequency (DTMF) tones to indicate its presence. The autodialer 12 responds with a string of DTMF tones which indicate, among other information, an identifier of the source fax machine 10 and the destination fax number. The source FTR 28 validates the received data and acknowledges such receipt with another DTMF signal to the autodialer 12. The autodialer then removes itself from the circuit allowing the attached fax machine 10 to communicate directly with the source FTR 28.

Prior to receiving the document from the customer fax machine 10, source FTR 28 creates two files with unique names: a fax file to hold the incoming fax and a companion file called an envelope. A complete envelope file contains a variety of information generally including the source fax machine number, the destination number, the number of pages in the document and the total reception time; that is, all the information required to deliver the fax and bill the customer. FTR 28 then begins to receive the fax data and store it in a local buffer under the created filename. Once reception is complete and the call terminated the fax file is transferred to a file server 26 and the related envelope file is transferred to a source TA 28 to begin the file routing process. Note that all this activity takes place within the source node 20.

The delivery process begins with an examination of the envelope to determine the document destination. The source TA 28 decides on an appropriate route and forwards the envelope, via source router 24 over dedicated circuit 60 to destination router 44, and to the selected destination TA 42. From there, the envelope is relayed to a destination FTR 48. After retrieving the entire fax document from the source file server 26, the destination FTR dials the destination fax number to commence delivery.

The destination FTR 48 attempts to deliver the document by calling the destination fax machine 70 through the destination country's PSTN 30. The result of the attempt is either:

Successfully delivered—the document was delivered to the destination fax machine 70;

Failed attempt—the document was not delivered to the destination fax machine 70 because of one of the following conditions:
  busy line
  no answer
  broken connection
  non-fax (for example, voice detected)
  other (a general term assigned to a number of telephony or faxing errors).

Once the document is successfully delivered, the destination FTR 48 updates its copy of the envelope with final delivery information and returns it to the destination TA 42. This in turn forwards the envelope to the source TA 22, which transfers the information via dedicated circuit 60 and router 52 to the historical database 54 in central control facility 50. At some later time, the information will be retrieved from the system to compute a customer bill. Finally, the source TA 22 sends a request to the FS 26 to delete the delivered document.

If the document has not been successfully delivered on the first attempt, the destination FTR 48 makes additional delivery attempts at regular intervals over some predetermined time period, e.g., every five minutes for half an hour. If these subsequent delivery attempts are unsuccessful, the destination FTR 48 declares the document as "not delivered", suitably marks the corresponding envelope, and sends it to the destination TA 42 for return to the source TA 22. Noting the returned envelope as "not delivered", source TA 22 forwards it to a delivery assist system (DAS) 56 for resolution. The DAS will review the delivery history contained in the envelope and determine a course of action. Generally, a delivery analyst (human operator) will call the destination for more information, correct the telephone number and resubmit the document, reschedule delivery, or reroute the document to another fax machine. The delivery analyst enables the network provider to assure timely delivery of a faxed document.

Figure 3:
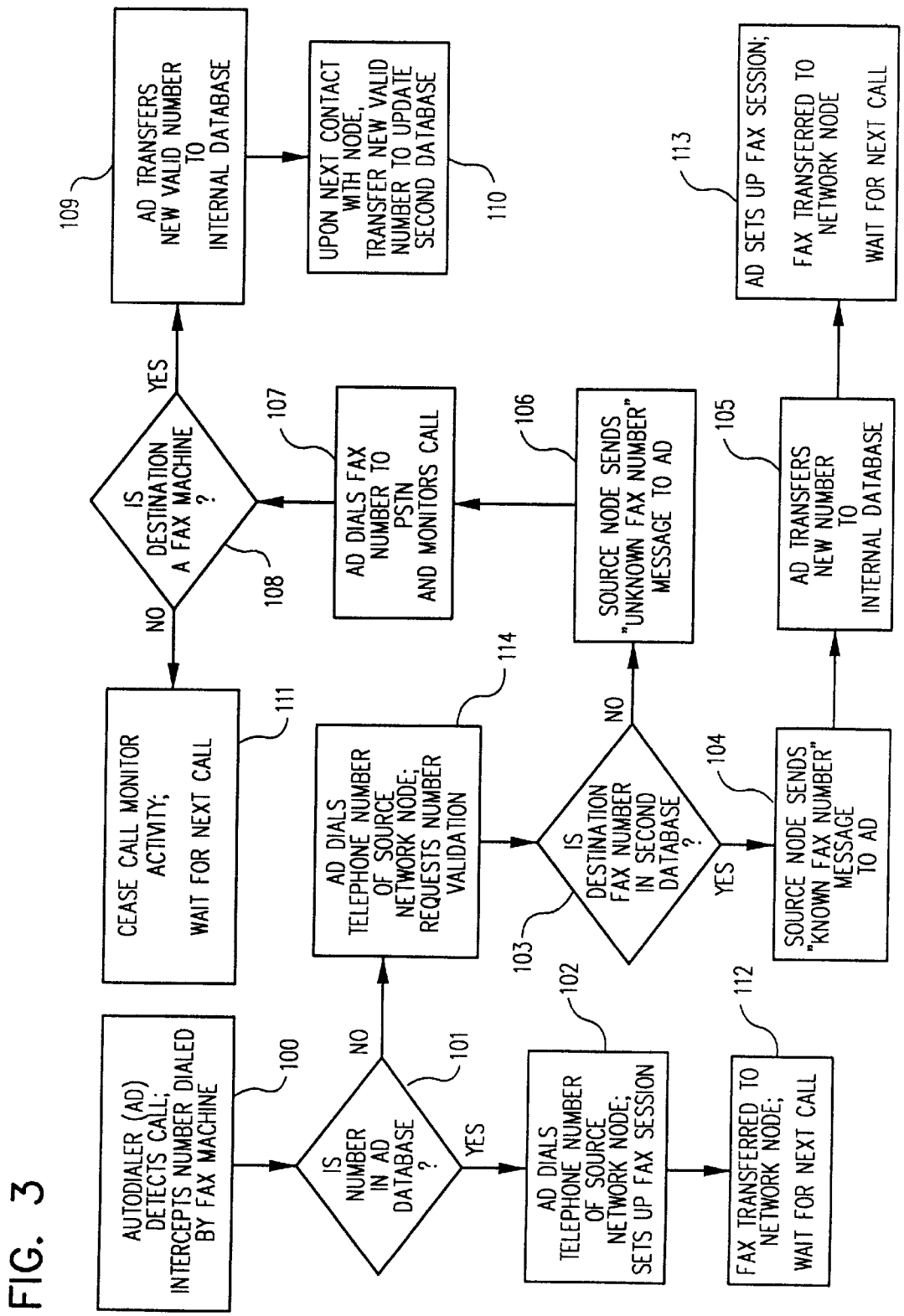
FIG. 3 is a flow chart describing a method embodiment of the present invention.

Within the context of the above-described method of delivering documents in a store and forward network, FIG. 3 illustrates one method embodiment of validating fax numbers in order to reduce the incidence of wrong numbers, and minimize the burden of reprogramming the autodialer 12 on each of the customer's fax machines.

In a first step 100, the autodialer (AD) 12 detects a call and intercepts the destination fax machine number dialed by the source fax machine 10. The autodialer checks its internal AD database 14 to determine whether the fax number is a valid number (step 101). If the fax number is contained in this internal database 14, AD 12 calls the source network node 20 to set up a fax session (step 102), sends source FTR 28 the fax document, and delivery then proceeds as previously described; AD 12 then awaits the next call (step 112). If the fax number is not included in the AD database, AD 12 calls network node 20 (step 114) and queries source FTR 28 as to whether the fax number is in a second distributed (FTR) database 27 (step 103). If the fax number is included in the second database 27, then source FTR 28 sends a valid or "known fax number" message to AD 12 (step 104). The autodialer updates its internal database 14 with the fax number (step 105), and proceeds to send the fax document to source FTR 28 (step 113). Again, delivery proceeds as previously described.

If the destination fax number is not included in FTR database 27, then source FTR 28 sends an "unknown fax number" message to AD 12 (step 106). The autodialer then attempts delivery of the fax document by means of the PSTN 30 (step 107); specifically, it dials the destination number and monitors the call to determine if it terminates at a fax machine (step 108); if yes, the AD updates its internal AD database 14 with the newly qualified fax number (step 109). In addition, during the next occasion in which it contacts the network node 20, the AD transfers the newly qualified fax number to FTR 28, allowing FTR database 27 to be updated (step 110). Returning to step 108, if the AD does not detect tones emitted by a receiving fax machine, the AD removes itself from the circuit and allows the attached fax machine to attempt to complete the transaction (step 111).

Communications between AD 12 and FTR 28 may be implemented as messages composed of DTMF tones. A total of 16 DTMF (0123456789#*ABCD) tones are available, allowing a one-digit hexadecimal value to be conveyed with each tone. The dialog between the autodialer 12 and source FTR 28 is half duplex, each side taking turns sending a message. After the initial message is sent from the autodialer, each successive message is sent only after the previous message has been received and processed. Only a minimum amount of data needs to be transferred; no files or large blocks of information are transported. Generally, the messages are small, e.g., not more than 100 bytes.

In one embodiment, a plurality of source (access) nodes in the network, each having an FTR database, periodically transmit update messages to the other nodes in order to update their FTR databases. In addition, on the occasion in which an autodialer contacts a network node, the FTR (residing in the contacted node) may transfer to the autodialer any new information contained in the FTR database.

By providing a complete listing of valid fax numbers in each network node, a distributed number qualification system is provided. Furthermore, by providing a valid number database locally at each autodialer, the system is further distributed so as to avoid unnecessary transmissions of fax documents to destinations previously validated by another autodialer in the system.

Note that an extensive S&F network will contain many nodes, each containing one or more FTR agents and an associated FTR database. In accordance with another method embodiment, the distributed FTR databases are updated via the central control facility 50, which can send messages via dedicated circuits 60 to routers in each of the network nodes. The valid fax numbers may be stored centrally in DAS database 58 and then distributed to each autodialer, on the occasion that the autodialer accesses its local node. The ability to thus change the list of valid fax numbers quickly and efficiently over the entire system, via a centralized control, is particularly advantageous in large networks with large numbers of fax machines, and/or in a network handling a large amount of traffic to a large number of destinations.

In a still further embodiment, the central control facility 50 can access and update the local databases in some or all of the autodialers through the PSTN (see dashed line 59 from central control 50 to PSTN 30 in FIG. 2).

In any of the above embodiments, the second (FTR) database may be coordinated to be the same in all network nodes, or it may be different in different subsets of nodes. For example, if all of the fax documents are sent from the United States to China, then the FTR database in the China nodes need not be the same as the FTR database in the U.S. nodes. Alternatively, some subset of U.S. nodes may be commonly programmed (coordinated) in accordance with a customer's dialing patterns.

The above-described embodiments may be implemented with a variety of hardware and/or software configurations. The functionality of the principal network components including the TA, FTR and FS can be achieved in software applications executing on standard PC platforms. The autodialer may be implemented as a standalone programmable device using specially designed hardware or completely in software on a PC which may also utilize a fax modem or other communication device. The choice of whether to use a few or many machines is dependent upon the amount of traffic carried as well as the desired system reliability and redundancy.

Figure 1:
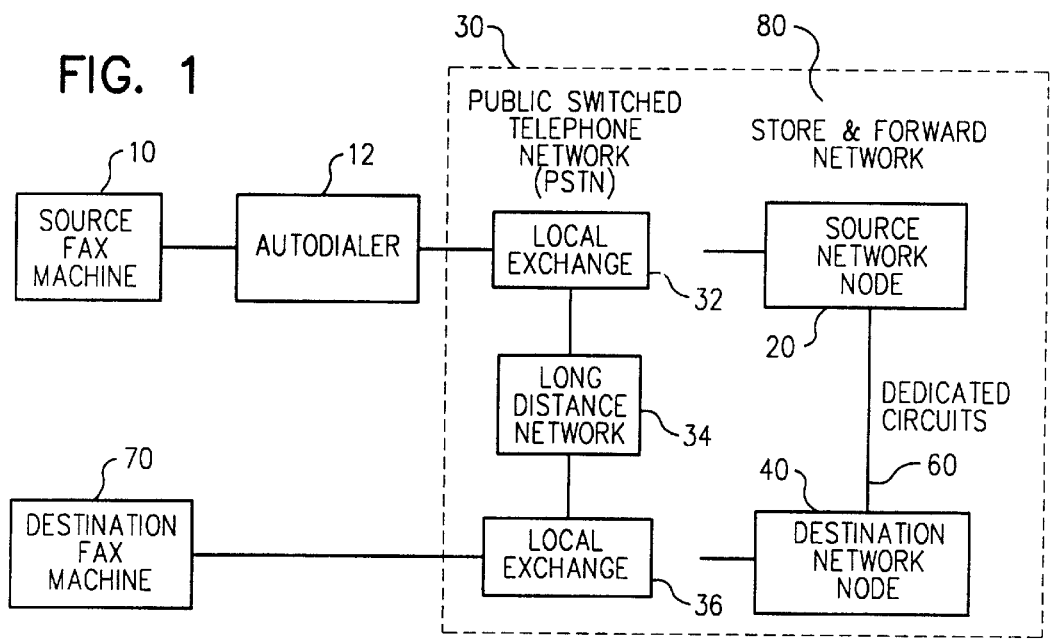
FIG. 1 is a schematic illustration of an S&F network disposed in parallel to a PSTN.
Figure 4:
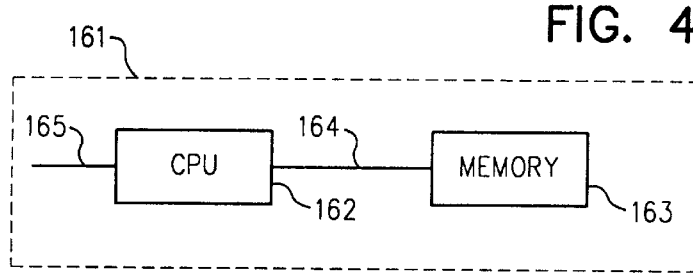
FIG. 4 is a block diagram illustrating a central processing unit and memory for use in this invention.

Various features of the invention may be implemented using a general purpose computer 161 as shown in FIG. 4. The general purpose computer may include a computer processing unit (CPU) 162, memory 163, a processing bus 164 by which the CPU can access the memory, and interface 165 to the network.

The invention may also be implemented as a memory, such as a floppy disk, compact disc, or hard drive, which contains a computer program or data structure, for providing to a general purpose computer instructions and data for carrying out the functions of the specific embodiment.

In other embodiments, the source fax machine 10 may be for example a desktop computer having a fax modem which connects to an autodialer, or a fax server (for example servicing a plurality of computers on a local area network) and connected to one or more autodialers. The software residing on the desktop computer or fax server will include the local database of validated fax numbers. Thus, as used herein, "fax machine" includes a desktop computer, fax server or other source of fax documents.

These and other modifications and improvements of the present invention will be understood by a person skilled in the art and are intended to be included within the scope of the claimed invention.

We claim:

1. A method of validating fax numbers for a selected network, wherein a plurality of fax machines, each having at least one associated autodialer, are connected to one or more access nodes of the selected network, the method comprising:

each autodialer monitoring its associated fax machine for outgoing fax numbers;

a selected autodialer intercepting an outgoing fax number and comparing the outgoing fax number to a first local database of valid fax numbers stored at the selected autodialer;

if a match exists with a number in the first database, the selected autodialer making a connection to an access node of the selected network;

if no match exists with a number in the first database, the selected autodialer contacting an access node and requesting the outgoing fax number be compared to a second distributed database of valid fax numbers accessible to a group of access nodes in the selected network;

if a match exists with a number in the second database, the contacted access node accepting a connection for the outgoing fax number.

2. The method of claim 1, wherein if a match exists with a number in the second database, updating the first database to include the outgoing fax number.

3. The method of claim 1, wherein if no match exists with a number in the second database, making a connection between the selected autodialer and a standard telephone network;

monitoring the connection for activity;

and if a detected activity indicates a fax destination, updating the first database to include the outgoing fax number.

4. The method of claim 3, wherein if the detected activity indicates a fax destination, the second database is updated to include the outgoing fax number.

5. The method of claim 4, wherein the second database is updated on a future occurrence of the selected autodialer contacting the access node.

6. The method of claim 1, wherein periodic messages update the first and second databases to conform the same.

7. The method of claim 1, wherein each time the first database is updated, the second database is updated.

8. The method of claim 1, wherein each time the second database is updated, the first database is updated.

9. The method of claim 1, wherein the second database is stored at each of the access nodes in the group.

10. The method of claim 1, wherein different second databases are available to different groups of access nodes.

11. The method of claim 1, wherein a central control facility updates the second database.

12. The method of claim 1, wherein a central control facility updates the first database.

13. The method of claim 1, wherein the selected network is a store-and-forward network.

* * * * *